Feb. 28, 1956  R. W. WAGNER  2,736,202
POWER TAKE-OFF CLUTCH
Filed Feb. 12, 1952  2 Sheets-Sheet 1
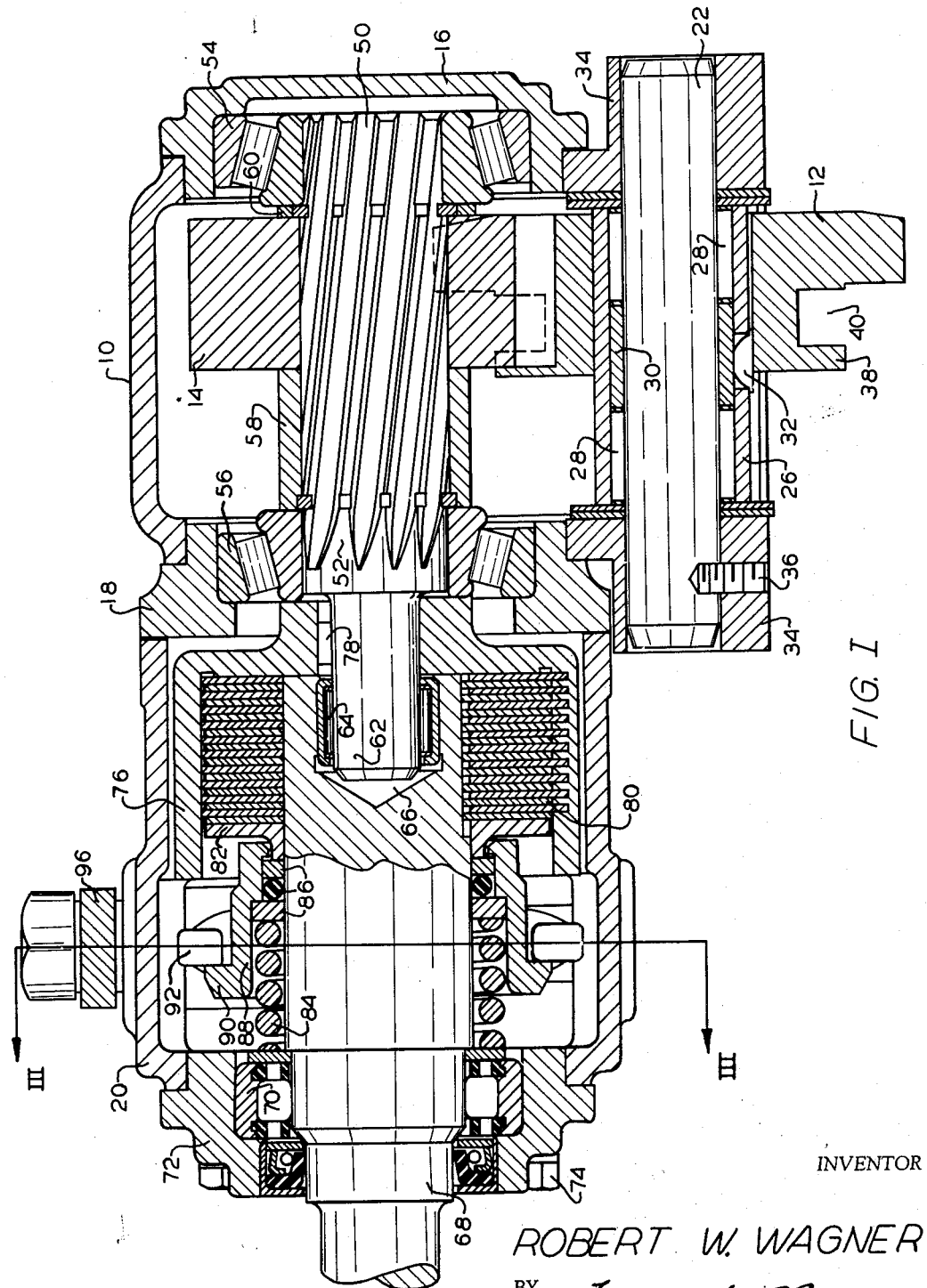
FIG. I
INVENTOR
ROBERT W. WAGNER
BY
ATTORNEY

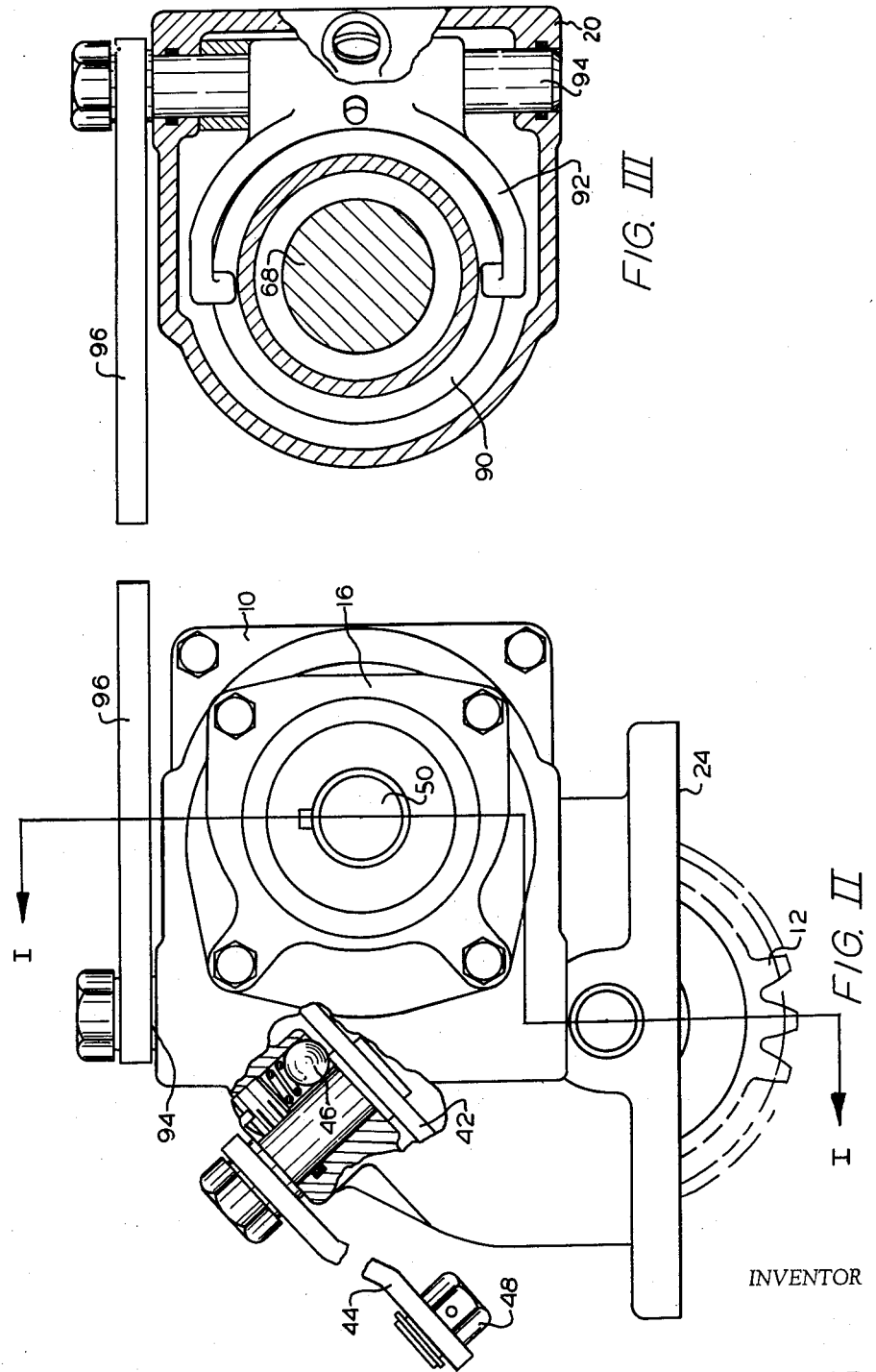

2,736,202
POWER TAKE-OFF CLUTCH

Robert W. Wagner, Chelsea, Mich.

Application February 12, 1952, Serial No. 271,229

4 Claims. (Cl. 74—15.86)

This invention relates to power take-off units employed in association with main power transmissions, such as the power transmissions of trucks, tractors or automobiles to provide an auxiliary power transmission for actuating, for example, hydraulic lifts and tail gates and for driving compressors on refrigerated trucks.

In connection with the use of these power take-off units on automobiles, generally, it has been found that where an attempt is made to shift the gears of the main transmission while the power take-off unit is being driven that the drag of the power take-off unit interrupts the synchronised operation of the gears with the result that with many types of transmissions it is impossible to shift the gears while the power take-off unit is being driven. This has given rise to objection particularly, but not exclusively, where the power take-off units have been employed to drive the refrigerator compressors of refrigerated trucks.

It is an object of the present invention to provide an improved power take-off unit which enables the above mentioned difficulty to be eliminated by the power take-off unit being rendered inoperative at the time when the clutch pedal of the main transmission is actuated to shift the gears of said transmission.

It is a further object of the invention to provide a power take-off unit which embodies a clutch which is capable of being connected with the clutch controlling the main transmission to enable the power take-off unit to be rendered inoperative when the transmission clutch is depressed to shift the gears.

These and further objects and advantages of the invention residing in the construction, arrangement and combination of parts, will become apparent from a consideration of the following description of one practical form of the invention with reference to the accompanying drawings and from the appended claims.

In the drawings:

Fig. I is a longitudinal sectional view of a power take-off unit in accordance with the invention, taken on the line I—I of Fig. II, Fig. II is an end view of Fig. I looking on the right hand end, and Fig. III is a section in the line III—III of Fig. I.

Referring to the drawings, the power take-off unit illustrated therein comprises a hollow casing portion 10 housing the gear train 12, 14 of the power take-off unit and having an end closure cap 16, and a clutch adaptor 18 and clutch housing 20 at its opposite end.

The power take-off gear train is shown as comprising an idler gear 12, supported upon an idler shaft 22 and exposed through an opening 24 in the casing 10, whereby when the power take-off unit is mounted in position this gear 12 can mesh with a gear of the main vehicle transmission. The gear 12 is mounted upon the idler shaft 22 through the medium of a bearing sleeve 26 supported upon the shaft 22 by axially spaced needle bearings 28 (these needle bearings being maintained in axially spaced relationship by a spacing sleeve 30) with the gear 12 keyed to the bearing sleeve 26 by the key 32, which permits the gear 12 to be shifted axially along the bearing sleeve for selected meshing engagement with gears of the main transmission, or for permitting the gear 12 to be adjusted to a neutral position. The shaft 22 is mounted at its ends in opposed boss portions 34 of the casing 10 and is secured therein by the set screw 36.

The gear 12 incorporates a side collar 38 defining a groove 40 in which a lever 42 engages to shift the gear 12 by the operation of an actuator lever 44 mounted upon the outside of the casing 10 and incorporating a selector ball detent 46 for determining the different adjusted positions of the gear 12. This actuator lever 44 can be connected for actuation from the vehicle control panel by a Bowden cable or like connection (not shown) connected with the lever at 48.

The gear 14, driven by the gear 12, is mounted upon a helical spline portion 50 of a shaft 52, said shaft being mounted at one end in a roller bearing assembly 54 carried in the end cap 16 and being mounted near its opposite end in a roller bearing assembly 56 carried in the clutch adaptor 18. A spacer sleeve 58 serves to locate the gear 14 on the spline 50 and a thrust washer 60 is shown fitted between this spacer sleeve and the bearing assembly 54.

At the end thereof, adjacent the bearing assembly 56, the shaft 52 has a reduced end portion 62 which extends into the clutch housing 20 and is supported by needle bearings 64 in a socket 66 in the adjacent end of a shaft 68, which shaft constitutes the take-off shaft of the power take-off unit. This shaft is adapted for connection to the auxiliary, such as the compressor of a refrigerated truck, which it is desired to drive from the power take-off unit.

The shaft 68 is supported at its outer end in a bearing assembly 70 carried in a bearing cap 72 secured upon the clutch housing, as by the bolts 74. Within the clutch housing, the shaft 68 carries a clutch cup 76 keyed to the shaft extension 62 by the key 78 and enclosing a series of clutch plates 80 engaged between the clutch cup and a thrust collar 82 mounted upon the shaft 68 and normally urged to the right, as seen in Fig. I by the action of the coil spring 84. This spring exerts pressure against the thrust collar 82 through the medium of a thrust collar and bearing assembly 86 mounted about the shaft 68 and enclosed within a collar 88, which collar forms part of the clutch shifter mechanism of the power take-off unit. The collar 88 has a peripheral flange 90 against which the ends of a shifter fork engage, this fork being secured upon a cross shaft 94 mounted in the clutch housing and carrying, on the outside of the housing, a lever 96, which lever is adapted for connection with the clutch pedal (not shown), of the main transmission.

The construction and arrangement is such that normally the spring 84, through the medium of the thrust bearing 86 and thrust collar 82, engages the clutch plates 80 to cause the power take-off shaft 68 to be driven. However, upon the clutch pedal of the main transmission being depressed to shift the gears of this transmission the lever 96 will be simultaneously actuated to cause the fork 92 to shift the thrust collar 88 to the left, as seen in Fig. I. This releases the clutch plates from their driving relationship and thereby permits the gear 12 to rotate idly so far as operation of the power take-off unit is concerned. The main transmission, therefore, is relieved of any load from the power take-off unit when shifting the gears of the main transmission. Upon the clutch of the main transmission being released, the lever 96 is automatically returned to its original position and the spring 84 acts so as automatically to re-engage the clutch plates 80.

Having thus described my invention what I claim as novel and wish to secure by Letters Patent is as follows:

1. In a power take-off unit for connection to be driven by a main transmission, casing structure, a gear train mounted in said casing structure, said gear train including an idler gear, a driven shaft and a gear on said driven shaft, said driven shaft having an end extension and said casing structure including a clutch housing, said shaft extension being located in said clutch housing, a power take-off shaft, means mounting said power take-off shaft in said clutch housing in coaxial extension of said driven shaft, said driven shaft and extension being rotatably supported in an end portion of said power take-off shaft, a clutch connecting said power take-off shaft with said driven shaft and actuating means for releasing said clutch, said actuating means being adapted for connection with the clutch pedal controlling the actuation of the clutch of the main transmission, said clutch including a first thrust member keyed upon said driven shaft, a second thrust member axially slidable upon said power take-off shaft, a series of clutch discs enclosed between said thrust members and a coil spring urging said axially slidable thrust member into position to engage said clutch discs, said actuating means including a shifter collar mounted about said coil spring and stressed by the spring into clutch applying relationship with respect to said second thrust member and lever means connected with said collar to shift the collar axially against the spring action and thereby disengage the clutch discs, said lever means including a lever on the outside of the clutch housing adapted for connection with the clutch pedal of the main transmission to synchronize the release of the power take-off clutch with the depression of the clutch pedal of the main transmission.

2. In a power take-off unit for connection to be driven by a main transmission, casing structure, a gear train mounted in said casing structure, said gear train including an idler gear, a driven shaft and a gear on said driven shaft, said driven shaft having an end extension and said casing structure including a clutch housing, said shaft extension being located in said clutch housing, a power take-off shaft, means mounting said power take-off shaft in said clutch housing in coaxial extension of said driven shaft, said driven shaft and extension being rotatably supported in an end portion of said power take-off shaft, a clutch connecting said power take-off shaft with said driven shaft and actuating means for releasing said clutch, said actuating means being adapted for connection with the clutch pedal controlling the actuation of the clutch of the main transmission, said clutch including a first thrust member keyed upon said driven shaft, a second thrust member axially slidable upon said power take-off shaft, clutch members enclosed between said thrust members, a coil spring mounted about said take-off shaft, a thrust bearing assembly upon said take-off shaft between said second thrust member and said coil spring, said coil spring urging said second thrust member to the clutch engaging position through the medium of said thrust bearing assembly, said actuating means including an axially slidable shifter collar, said shifter collar co-acting with said thrust bearing assembly to take the spring pressure off said second thrust member in order to disengage said clutch members.

3. In a power take-off unit for connection to be driven by a main transmission having a control clutch, casing structure, a gear train mounted in said casing structure, said gear train including an output shaft and said casing including a clutch housing, said output shaft having an end extension extending into said clutch housing, a power take-off shaft in said clutch housing, bearing means supporting said end extension in one end of said power take-off shaft, a clutch connecting said power take-off shaft with said output shaft, said clutch including a thrust member keyed on the said output shaft, a second thrust member axially slidable on said take-off shaft, clutch members between said thrust members, resilient means constantly urging said axially slidable thrust member to engage said clutch members, and shifter means carried by said thrust member for axial movement against the action of said resilient means for causing disengagement of said clutch members, said shifter means being adapted for connection with the main transmission clutch.

4. In a power take-off unit for connection to be driven by a main transmission having a control clutch, casing structure, a gear train mounted in said casing structure, said gear train including an output shaft and said casing including an end extension forming a clutch housing, said output shaft having an end extension, a power take-off shaft, means rotatably mounting said take-off shaft in said clutch housing in co-axial alignment with said output shaft, the said end extension of which is mounted on said take-off shaft, a clutch for connecting said power take-off shaft with said output shaft, said clutch including a first axial thrust member secured to said output shaft to rotate therewith, a second axial thrust member axially slidable upon said take-off shaft, clutch members retained between said thrust members, a spring engaged with said second thrust member to constantly urge said clutch members into the clutch engaging position in which the output shaft drives the take-off shaft, and actuator means engageable to shift said second thrust member against the action of said spring to disengage said clutch members, said actuator means being adapted for connection with the main transmission clutch.

References Cited in the file of this patent

UNITED STATES PATENTS

| | | |
|---|---|---|
| 1,194,994 | Gramm | Aug. 15, 1916 |
| 1,483,231 | Maynard | Feb. 12, 1924 |
| 2,330,296 | Lundberg | Sept. 28, 1943 |